United States Patent Office 3,561,043
Patented Feb. 9, 1971

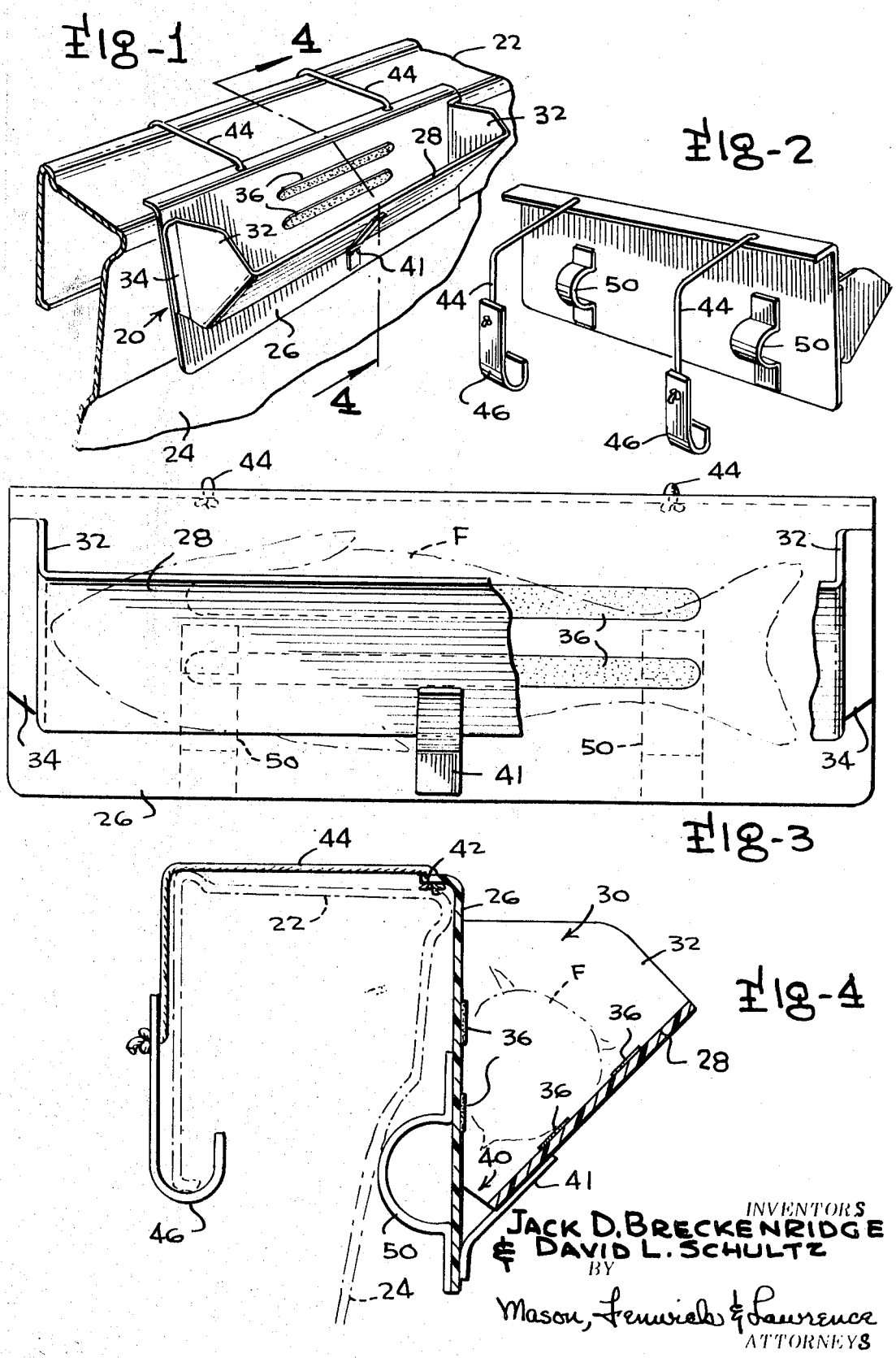

3,561,043
BOAT MOUNTED HOLDER FOR ENABLING CLEANING OF FISH
Jack D. Breckenridge, 519 S. Iron St., and David L. Schultz, 3204 Laurel Lane, both of Centralia, Wash. 98531
Filed Nov. 12, 1969, Ser. No. 875,783
Int. Cl. A22c 25/06
U.S. Cl. 17—53          5 Claims

ABSTRACT OF THE DISCLOSURE

A fish holder formed with a vertical plate and an inclined plate connected to provide a trough with an opening in the bottom and having cords extending from the top over the gunwale of a boat with hooks on the end of the cord to be engaged with the under edge of the inside of the gunwale and with adhesive means on the interior of the trough for preventing movement of a fish held in the trough for cleaning with a bumper means on the exterior of the trough for holding the holder in position against the exterior of the boat hull without marring the hull.

BACKROUND OF THE INVENTION

This invention is in the field of support means or holders and is specifically directed to a holder for supporting a fish in a relatively fixed position for cleaning. Even more specifically, the invention is directed to a fish holder adapted for attachment to the side of a boat for permitting the cleaning by an occupant of the boat of a fish held within the holder.

Nature has provided most fish with an exterior that is extremely slippery and which makes it extremely difficult to hold a fish in a fixed position for scaling and removal of the entrails and other internal and external parts of the fish during cleaning of the fish. The desirability of providing means for retaining a fish in a fixed position during cleaning has long been recognized by those skilled in the art, and numerous devices for this purpose have consequently evolved. While some of the prior known devices have been fairly satisfactory, they have suffered from a number of deficiencies such as cumbersomeness, high cost and low functional efficiency while employed with various types of fish. Moreover, a number of the prior known devices have been difficult to clean following usage and have consequently presented a sanitary hazzard.

Additionally, the prior known fish holders have universally been of the type requiring use on shore and have not been capable of providing a satisfactory means for enabling a fisherman to clean fish in the boat from which the fish are caught. The inability of the prior known devices to provide satisfactory service when used in small boats is due to the fact that there is no satisfactory place for mounting or supporting such devices and the use of such devices in a small boat would necessarily involve the spillage of blood, entrails or other fish parts on the interior of the boat which would obviously create the necessity of cleaning the boat in order to avoid the unpleasant and undesirable effects of permitting such parts to remain on the interior of the boat.

The instant invention solves the problems of the prior known devices in providing a uniquely simple and economical to construct fish holder which can be mounted on the exterior of the boat for holding a fish to be cleaned. Additionally, the instant invention is provided with a drainage slot by which the entrails and other fish parts can be discharged into the body of water in which the boat is operating with no difficulty whatsoever. Moreover, the instant invention provides a trough into which fish of varying sizes can be received and retained in fixed position regardless of size during cleaning. For these reasons, it will be apparent that the subject invention is a vast improvement over the prior known fish holding devices and enables the obtainment of unique efficiency and functional operability far in excess of any other known devices. Moreover, the subject invention is easy to use and is much more economical to construct than many of the prior known devices. Additionally, the subject invention can be constructed of fiberglass to provide corrosion resistance for usage in salt water areas. Yet another substantial advantage of this invention resides in the fact that it can easily be removed from a boat in a matter of seconds and can also be easily adjusted to be used on practically any type boat.

SUMMARY OF THE INVENTION

It is the primary object of this invention to provide a new and improved fish holder for enabling the cleaning of fish in an efficient manner.

Obtainment of the object of this invention is enabled through the provision of a fish holder in the form of a vertical plate and an inclined plate connected together by end plates to define a V-shaped trough. The innermost walls of the trough are provided with friction enhancing adhesive strips which prevent movement of the fish and a slot is provided along the apex of the trough to permit the discharge of fish parts. A horizontal flange along the upper edge of the vertical plate is connected to a pair of flexible cords which can be extended over a boat gunwale and connected along the upper edge of the inner side of the gunwale to mount the holder on the exterior of the boat hull. Additionally, flexible bumper means on one side of the vertical plate engages the boat hull to maintain the holder in a substantially vertical orientation in order that a fish within the trough will be retained therein by means of gravity.

DESCRIPTION OF THE DRAWINGS

FIG. 1 is a perspective view of the preferred embodiment of the invention showing same attached to the gunwale of a boat;

FIG. 2 is a perspective view of the preferred embodiment as viewed from the rear;

FIG. 3 is a side elevational view of the preferred embodiment; and

FIG. 4 is a sectional view taken along lines 4—4 of FIG. 3.

DESCRIPTION OF THE PREFERRED EMBODIMENT

Turning first to FIG. 1, it will be seen that the preferred embodiment, which is generally designated 20, is attachable to the gunwale 22 of a boat so that the device is supported on the exterior 24 of the boat hull.

The preferred embodiment comprises a holder in which a main vertical plate 26 cooperates with an inclined plate 28 to define a trough 30 between the two plates.

Inclined plate 28 is unitarily formed with a V-shaped end plate 32 extending from each end plate 28 for connection to the main vertical plate 26. Such connection is enabled through a bond of adhesive or a heat bond between vertical plate 26 and bonding flanges 34 extending along the inner edge of the V-shaped plates 32. It should be understood that the preferred embodiment can be formed of plastic, fiberglass or metal with the manner in which the elements are bonded together depending upon the material employed. For example, if the device were constructed of metal, rivets or welds would be the preferable way for attaching the bonding flanges 34 to the vertical plates 26.

Trough 30 is dimensioned to receive a fish F which rests on the interior of the trough and is retained in position by one or more strips of high friction adhesive 36 on plates 26 and 28. It should be noted that the lower edge of inclined plate 28 does not engage the vertical plate 26 and a drainage slot 40 extending along substantially the entire length of the holder is consequently provided. However, a brace plate 41 extends between the vertical plate 26 and the bottom of inclined plate 28 to prevent plate 28 from bulging outwardly when a heavy fish is resting in trough 30.

The holder is supported in position by virtue of a horizontal flange 42 extending along the upper edge of the vertical plate 26 and having a pair of flexible cords or the like 44 connected thereto. Cords 44 extend across the top of the gunwale and have hooks 46 made of plastic, fiberglass or metal on their extreme end which are hooked under the inner edge of the gunwale as best illustrated in FIG. 4. The use of plastic or fiberglass hooks prevents marring of the boat surface and the connection between the hooks and cords 44 is easily adjusted so as to fit the device to various types of boats.

Additionally, flexible bumpers 50 extend outwardly from the side of the vertical plate 26 adjacent to the boat hull 24 for maintaining the plate 26 in substantially vertical orientation and for preventing marring of the hull.

Therefore, it will be seen that the subject invention provides a uniquely efficient fish holder which can be employed while in the fishing location for cleaning previously caught fish and could also be employed while returning to dock following the completion of a fishing day. The fish parts are easily washed away through the drainage slot 40 and do not enter the interior of the boat. Moreover, the bumpers 50 maintain the slot outwardly from the side of the boat so that the fish parts and blood drained from slot 40 normally do not even engage the exterior of the boat hull.

We claim:

1. A fish holder for enabling the cleaning of fish comprising an elongated trough of relatively narrow bottom width and relatively wide top width dimensioned to receive and hold a fish to be cleaned, said trough comprising a main vertical bracket plate and an inclined plate inclined with respect to said vertical bracket plate and connected to said vertical bracket plate by end walls oriented in planes substantially perpendicular to said vertical plate and said inclined plate, a drain opening in the bottom of said trough, friction increasing means on the interior of said trough for resisting movement of a fish supported within said trough, support means for supporting said holder in an orientation so that a fish will be retained in said trough by gravitational force wherein said support means includes a horizontal flange along the upper edge of said vertical bracket plate and hook means connected to said horizontal flange by flexible cords for hooking engagement with the inside of a boat to enable support of said fish holder along the exterior of a boat hull.

2. The invention of claim 1 additionally including bumper means on the back side of said vertical bracket plate adjacent the boat hull for engaging the boat hull for enabling positioning said vertical bracket plate in a substantially vertical plane.

3. The invention of claim 2 wherein said friction means comprises strips of friction enhancing material attached to the inside of said trough on said vertical bracket plate and said inclined plate.

4. A fish holder for enabling the cleaning of fish comprising an elongated trough of relatively narrow bottom width and relatively wide top width dimensioned to receive and hold a fish to be cleaned, said trough comprising a main vertical bracket plate and an inclined plate inclined with respect to said vertical bracket plate and connected to said vertical bracket plate by end walls oriented in planes substantially perpendicular to said vertical bracket plate and said inclined plate, a drain opening in the bottom of said trough and support means for supporting said holder in an orientation so that a fish will be retained in said trough by gravitational force wherein said support means includes a horizontal flange along the upper edge of said vertical bracket plate and hook means connected to said horizontal flange by flexible cords for hooking engagement with the inside of a boat to enable support of said fish holder elements along the exterior of a boat hull.

5. The invention of claim 4 additionally including bumper means on the side of said vertical bracket plate adjacent the boat hull for engaging the boat hull for enabling positioning said vertical bracket plate in a substantially vertical plane.

References Cited

UNITED STATES PATENTS

| 577,672 | 2/1897 | Waldemann | 17—44X |
| 1,724,006 | 8/1929 | Covey | 17—44 |

LUCIE H. LAUDENSLAGER, Primary Examiner